United States Patent [19]

Hart

[11] 4,262,556

[45] Apr. 21, 1981

[54] DRIVE MECHANISM

[75] Inventor: Cullen P. Hart, Peoria, Ill.

[73] Assignee: Caterpillar Tractor Co., Peoria, Ill.

[21] Appl. No.: 965,555

[22] Filed: Nov. 24, 1978

[51] Int. Cl.³ .............................................. F16H 1/28
[52] U.S. Cl. ....................................... 74/805; 91/490
[58] Field of Search .................... 74/800, 805; 91/490, 91/492, 494

[56] References Cited

U.S. PATENT DOCUMENTS

| 3,052,138 | 9/1962 | Louton et al. | 74/805 |
| 3,215,043 | 11/1965 | Huber | 91/56 |
| 3,339,460 | 9/1967 | Birdwell | 91/56 |
| 3,413,896 | 12/1968 | Wildhaber | 74/805 X |
| 3,627,087 | 12/1971 | Eskridge | 74/805 X |
| 3,762,488 | 10/1973 | Dammon | 91/492 X |
| 4,074,615 | 2/1978 | Avery | 91/490 |

Primary Examiner—C. J. Husar
Assistant Examiner—Frank McKenzie
Attorney, Agent, or Firm—William B. Heming

[57] ABSTRACT

A drive mechanism (10) is used, for example, in an orbiting radial motor (12) to rotate a sprocket (22) or in a multiple output speed increaser or reducer to control output. The drive mechanism (10) has a first member (16) positioned about and rotatable relative to a frame (14). A second member (18) is positioned generally between the frame (14) and first member (16) and engages and rotates the first member (16). The first member (16), for example, is connected to and rotates the sprocket (22) for driving a track of a work vehicle. The drive mechanism (10) has only a single element (34) for establishing the drive ratio of the first member (16) relative to the second member (18) and receiving and transmitting reaction torquing force on the second member (18) in response to the second member (18) engaging the first member (16). Thus, reaction loads on, for example, bearings (68,70) supporting the second member (18) are substantially eliminated and the drive ratio can be widely varied.

19 Claims, 4 Drawing Figures

DRIVE MECHANISM

DESCRIPTION

1. Technical Field

The invention relates to a drive mechanism having a first member engaged and rotated by a second member in response to said second member rotating in an orbital pathway relative to a frame of the drive mechanism. More particularly, the invention relates to the drive mechanism having only a single element for establishing the drive ratio of the first member relative to the second member and receiving and transmitting reaction torquing force on said second member in response to said second member engaging the first member.

2. Background Art

In the use of a drive mechanism, it is desirable to substantially reduce bearing loads in the drive mechanism and to provide the members of the drive mechanism in a relationship sufficient for maximizing the gear reduction available. The present invention relates to substantially reducing the loads encountered by bearings supporting one member which engages and drives another member. The present invention also relates to the use of only a single element to receive and transmit said loads and to establish the drive ratio for the drive mechanism.

U.S. Pat. No. 4,074,615 which issued to Avery on Feb. 21, 1978, shows an orbiting motor gear drive having a rotating assembly which engages and drives a ring gear. The rotating assembly includes a plurality of journalled crankshafts and a gear in engagement with the ring gear. U.S. Pat. No. 3,762,488 which issued to Dammon on Oct. 2, 1973, shows another embodiment of the gear drive.

U.S. Pat. No. 3,339,460 which issued to Birdwell on Sept. 5, 1967, shows a rotor which rotates in an orbital pathway to drive a central shaft. Said rotor also has ports which establish fluid flow to cylinders for rotating said rotor. U.S. Pat. No. 3,215,043 which issued to Huber on Nov. 2, 1965, shows a hydraulic torque motor having a rotor meshing with an externally lobed member for rotation in an orbital path about the axis of a shaft.

For example, an orbiting radial motor is used to drive a sprocket of an associated work vehicle. Such a motor is disclosed, for example, in the above mentioned U.S. Pat. No. 4,074,615. The radial motor has a first member connected to the sprocket and a second member which engages and rotates the first member. The first member includes an internally toothed gear and a housing to which the sprocket is attached. The second member is an externally toothed gear which moves relative to a frame of the radial motor to drive the sprocket. Movement of said second member is usually accomplished by hydraulically actuated slipper pistons acting on the second member.

Heretofore, the second member has been supported through a plurality of eccentric members and bearings by pins or crankshafts connected to the frame of the radial motor. Gear reduction has been taken through the second member in its orbital engagement of the first member. The eccentric members and bearings support the second member in orbital movement relative to the frame. The pins and bearings take the reaction torquing force on said second member which results from said second member engaging the first member. The resultant high loads on the bearings can cause undesirable performance characteristics and premature failure. The high loads can also cause distortion of the frame owing to localized loading on the pins. Frame distortion effects operation of the radial motor owing to interference with valving for the slipper pistons.

The present invention is directed to overcoming the problems associated with the high bearing and pin loading and to providing flexible gear reduction in the improved radial motor. Therefore, only a single element has been provided for torquing gear reduction and receiving and transmitting the reaction torquing force in the radial motor for substantially reducing pin and bearing loads as well as providing gear reduction in the drive mechanism of the orbiting radial motor.

DISCLOSURE OF INVENTION

In one aspect of the present invention, a drive mechanism has a first member positioned about a frame and a second member positioned generally between said frame and the first member. The second member is moveable in an orbital pathway about the frame and is of a construction sufficient for engaging and rotating the first member in response to said second member moving in said orbital pathway. First means is provided for rotating said second member. Second means is provided for supporting said second member in the orbital pathway relative to the frame axis. The drive mechanism has only a single element of a construction sufficient for establishing the drive ratio of the first member relative to the second member and receiving and transmitting reaction torquing force on said second member in response to said second member engaging said first member.

The drive mechanism is, for example, associated with an orbiting radial motor. The first member is connected to a sprocket of an associated work vehicle. The second member engages and rotates the member for driving the sprocket. Loads on said second member owing to the reaction torquing force of engaging the first member are received and transmitted by the single element to substantially reduce loads on, for example, bearings supporting said second member in the orbital pathway. The orientation of the single element also permits wide variations in the drive ratio for flexible use of the drive mechanism.

BEST MODE FOR CARRYING OUT THE INVENTION

Figure 1:
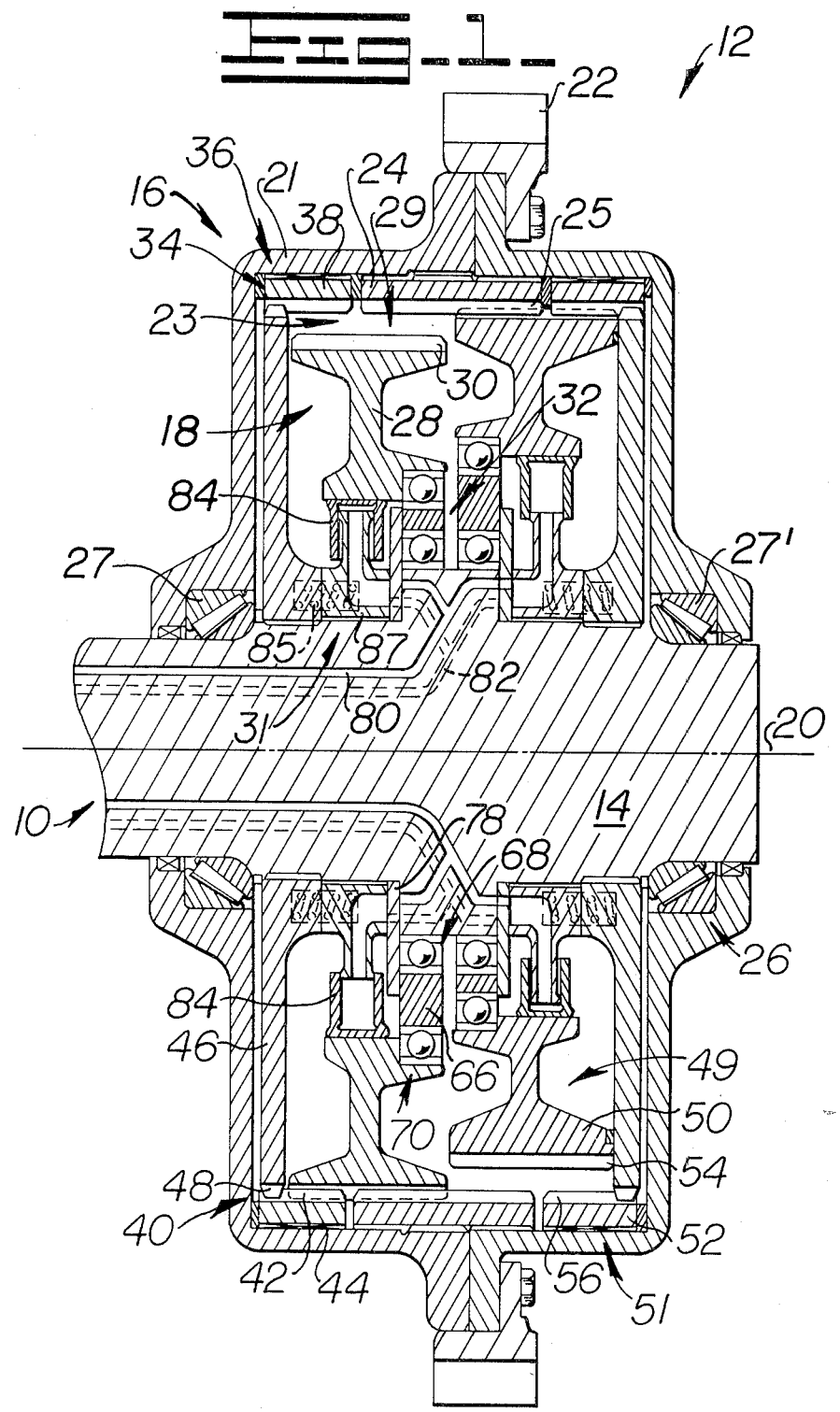
FIG. 1 is a diagrammatic cross sectional view showing an embodiment of the present invention associated with an orbiting radial drive.
Figure 2:
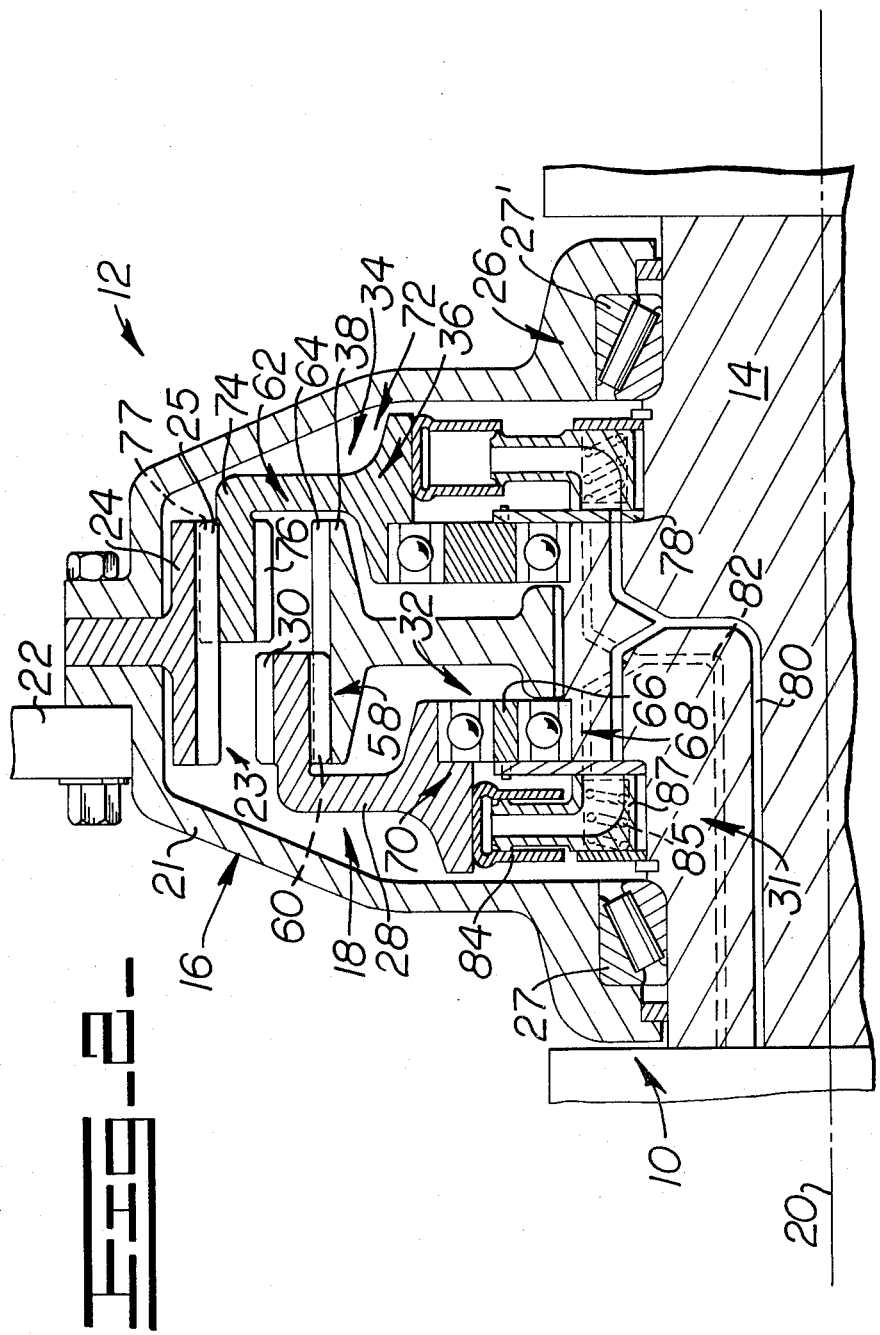
FIG. 2 is a diagrammatic cross sectional view showing another embodiment of the present invention in partial view and associated with the orbiting radial drive.
Figure 3:
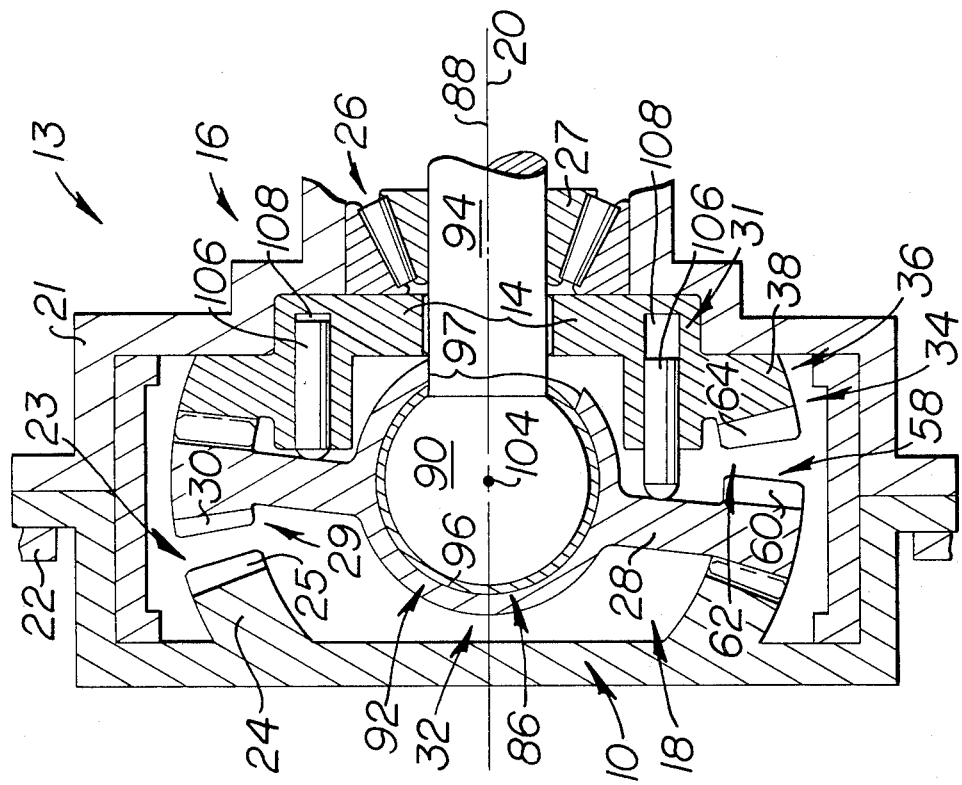
FIG. 3 is a diagrammatic cross sectional view showing yet another embodiment of the present invention in partial view and associated with an orbiting axial drive.
Figure 4:
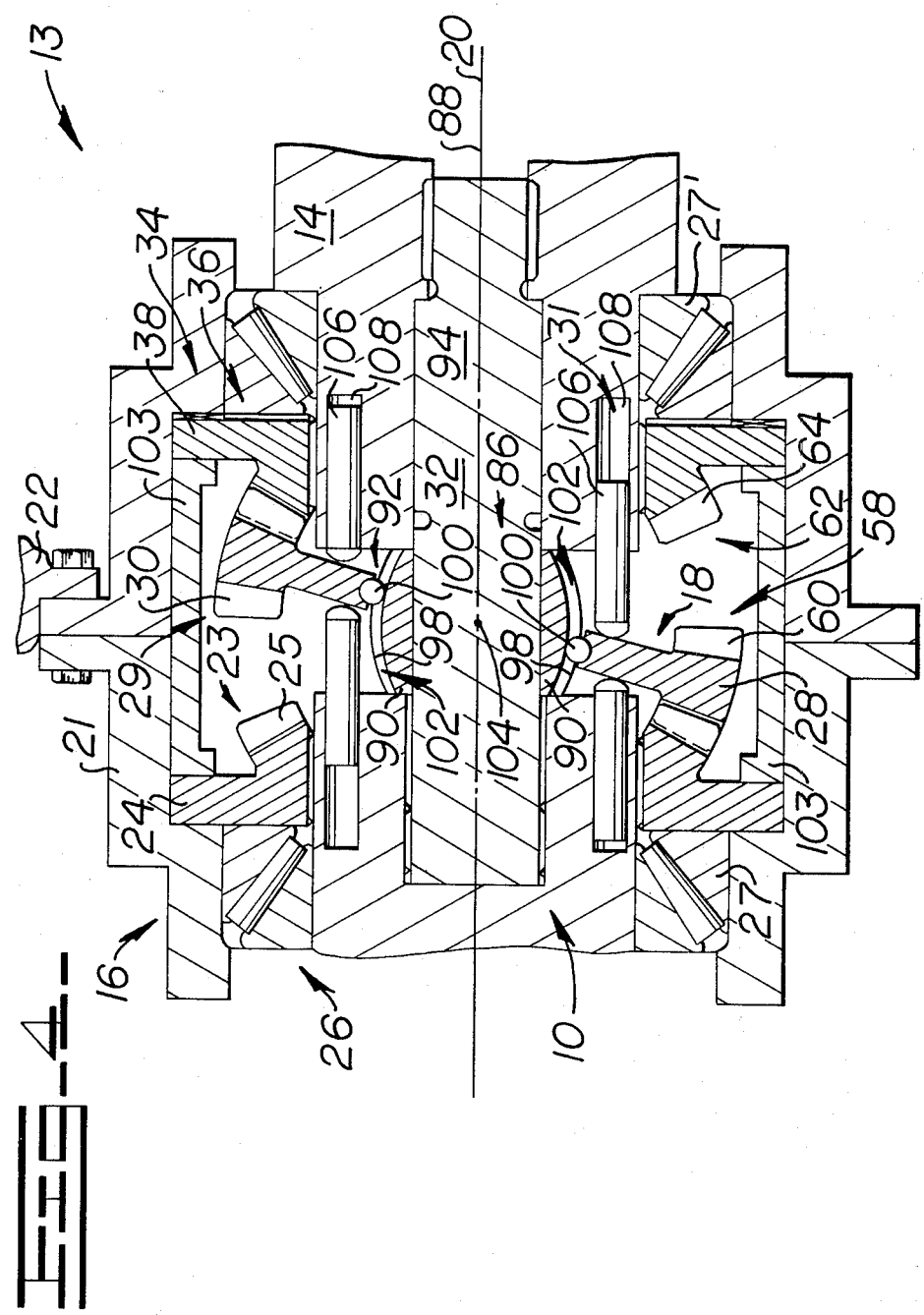
FIG. 4 is a diagrammatic cross sectional view showing still another embodiment of the present invention in partial view and associated with the orbiting axial drive.

Referring to the drawings, a drive mechanism 10 is shown associated with an orbiting radial drive 12 in the embodiments of FIGS. 1 and 2 and with an orbiting axial drive 13 in FIGS. 3 and 4. Said axial drive 13 is hereinafter referred to in the context of the radial drive 12. The drive mechanism 10 has a frame 14 and first and second members 16,18. Said frame 14 has an axis 20 and supports the orbiting radial drive 12. The first member 16 is positioned about the frame 14 and connected to a sprocket 22 of the radial drive 12. The sprocket 22 is used, for example, to engage and drive a track of an associated work vehicle (not shown). An orbiting radial drive is disclosed, for example, in U.S. Pat. No. 4,074,615 which issued to Avery on Feb. 21, 1978. Said radial drive 12 and the drive mechanism 10 are hereinafter more fully described.

The first member 16 of the drive mechanism 10 has an inner surface 23 and is, for example, a first gear 24 and the housing 21 of the radial drive 12. The first gear 24 can be integral with (FIG. 3) or fixably connected to (FIGS. 1, 2 and 4) said housing 21. Said first gear 24 has teeth 25 arcuately spaced one from the other and defining said inner surface 23. A first bearing element 26 is positioned between the first member 16 and the frame 14 and supports the first member 16 and first gear 24 in rotatable relationship relative to the frame 14. Said bearing element 26 is represented by first and second roller bearing assemblies 27,27' in FIGS. 1, 2 and 4 and a single bearing assembly 27 in FIG. 3.

The second member 18, shown, for example, as a second gear 28, is positioned generally between the frame 14 and the first gear 24. The second gear 18 is movable in an orbital pathway relative to the axis 20 of said frame 14. Said second gear 28 has an outer surface 29 and is of a construction sufficient for engaging and rotating the first gear 24 in response to said second gear 28 moving in said orbital pathway. Teeth 30 arcuately spaced one from the other define said outer surface 29 and are positionable in engagement with the teeth 25 of the first gear 24 for rotating said first gear 24.

The drive mechanism 10 also has first and second means 31,32. The first means 31 is provided for rotating the second gear 28. The second means 32 is provided for supporting the second gear 28 in the orbital pathway of said second gear 28 relative to the axis 20 of the frame 14. Said means 31,32 will be hereinafter more fully described with reference to the specific embodiments of the present invention.

In the drive mechanism 10, only a single element 34 is provided for establishing the drive ratio of the first gear 24 relative to the second gear 28 and receiving and transmitting reaction torquing force on said second gear 28 in response to said second gear 28 engaging said first gear 24. In other words, gear reduction of the drive mechanism 10 is taken through the single element 34. Said single element 34 takes the reaction load on the second gear 28 owing to said second gear 28 engaging and tending to rotate the first gear 24. The single element 34 is a third member 36 such as a third gear 38. Said third gear 38 is connected to the frame 14 and positioned in contactable relationship with the second gear 28.

Referring to the embodiment of FIG. 1, the third gear 38 contacts the second gear 28 about the outer surface 29 of said second gear 28. Said third gear 38 has an inner surface 40 defined by teeth 42 arcuately spaced one from the other. The teeth 42 are positioned in engaging relationship with the teeth 30 of the second gear 28 in response to said second gear 28 engaging and rotating the first gear 24. Said teeth 42 thus mesh with the teeth 30 of the second gear 28 during operation of the drive mechanism 10 for establishing contact of said second and third gears 28,38.

The third gear 38 is positioned adjacent the housing 21 and concentric with the first gear 24. A second bearing element 44 is positioned between said third gear 38 and the housing 21 and supports the third gear 38 in rotation relative to the housing 21. It is desirable that the third gear 38 be connected to the frame 14 by a connecting member 46. The connecting member has teeth 48 positioned in engagement with the third gear 38 and is fixably connected to the frame 14. In this manner, a rigid connection between the third gear 38 and frame 14 is avoided.

As is shown in FIG. 1, the drive mechanism 10 preferably has fourth and fifth members 49,51 incorporated therein in substantially the same manner as the second and third members 16,18. The fourth member 49, shown as a fourth gear 50, has teeth 54 arcuately spaced one from the other and is positioned generally between the frame 14 and first gear 24. Said fourth gear 50 is movable in an orbital pathway relative to the frame axis 20 and is of a construction sufficient for engaging and rotating the first gear 24 in response to said fourth gear 50 moving in said orbital pathway. The teeth 54 engage the teeth 25 of the first gear 24 for rotating said first gear 24. It is desirable that the points of engagement of the second and fourth gears 28,50 with the first gear 24 respectively, be about 180° one from the other for equal loading of the gear train.

The fifth member 51, shown as a fifth gear 52, is of a construction sufficient for reducing the drive ratio of the first gear 24 relative to the fourth gear 50 and receiving and transmitting the reaction torquing force on said fourth gear 50 in response to said fourth gear 50 engaging said first gear 24. The fifth gear 52 is therefore substantially the same as the single element 34 above described. Said fifth gear 52 has teeth 56 arcuately spaced one from the other and positioned in engaging relationship with the teeth 54 of the fourth gear 50 in response to said fourth gear 50 engaging and rotating the first gear 24.

Referring to the embodiments of FIGS. 2–4, the second gear 28 also has an inner surface 58 defined by teeth 60 arcuately spaced one from the other. The third gear 38 contacts said second gear 28 about said inner surface 58. Said third gear 38 has an outer surface 62 defined by teeth 64 arcuately spaced one from the other. The teeth 64 are positioned in engaging relationship with the teeth 60 of the second gear 28 in response to said second member 18 engaging and rotating the first member 16. In the embodiment of FIG. 3, said third gear 38 is shown of unitary construction with the frame 14.

It is desirable that the drive mechanism 10 of FIG. 2 have another or sixth member 72, such as another or sixth gear 74, positioned generally between the frame 14 and the first gear 24 and movable in an orbital pathway relative to the axis 20 of the frame 14. The sixth gear 74 is of a construction sufficient for engaging and rotating the first gear 24 in response to said sixth gear 74 moving in the orbital pathway. Said sixth gear 74 has inner and outer teeth 76,77 which engage the teeth 64 of the third gear 38 and the teeth 25 of the first gear 24, respectively. Thus, said sixth gear 74 is incorporated into the drive mechanism 10 in substantially the same manner as the second gear 28.

The single element 34 or third gear 38 is of a construction sufficient for establishing the drive ratio of the first gear 24 relative to the sixth gear 76 and receiving and transmitting the reaction torquing force on said sixth gear 76 in response to said sixth gear 76 engaging the first gear 24. Another driving member acting on the first gear 24 can therefore be utilized while maintaining only the single element 34 for determining gear reduction and receiving and transmitting reaction forces on both driving members. The additional driving member or sixth gear 76 is positioned to contact the first gear 24 about 180° from the contact of the second gear 28 with said first gear 24 for maintaining dynamic balance in the drive mechanism 10.

In the embodiment of FIGS. 1 and 2, the second means 32 for supporting the second gear 28 in the orbital pathway includes an eccentric member 66 and third and fourth bearing elements 68,70. The eccentric member 66 is positioned between the frame 14 and the second gear 28 and extends about the frame 14. The third bearing element 68 is positioned between the frame 14 and said eccentric member 66 and supports said eccentric member 66 in rotation relative to the frame 14. Said fourth bearing element 70 is positioned between the eccentric member 66 and the second gear 28 and supports said second gear 28 in rotation relative to the eccentric member 66 and frame 14. The configuration of said eccentric member 66 thus determines the orbital pathway of the second gear 28 in movement relative to the frame 14. The fourth and sixth gears 50,74 of FIGS. 1 and 2, respectively, are similarly supported in their respective orbital pathways.

The first means 31 for rotating said second gear 28 includes a valve plate 78 connected to the eccentric member 66 and rotatable relative to the second gear 28 in response to movement of said second gear 28 in said orbital pathway. Said relative rotation occurs owing to the rotation of the eccentric member 66 in response to said second gear 28 rotating in the orbital pathway about the frame 14. The valve plate 78 has ports which controllably open and close fluid inlet and outlet passageways 80,82 in the frame. Said passageways 80,82 direct fluid from a pressurized fluid source (not shown) to or from hydraulically operated slipper pistons 84 which urge against, for example, the second gear 28 for rotating said gear 28. Springs 85 urge respective cylinders 87 associated with the pistons 84 against the valve plate 78 to substantially block leakage therebetween.

Referring now to the embodiments of FIGS. 3 and 4, the second means 32 includes a joint assembly 86 having an axis 88 substantially the same as the axis 20 of the frame 14. The joint assembly 86 is connected to the frame 14 and the second gear 28 and is of a configuration sufficient for freeing the second gear 28 for movement relative to said frame 14 generally along and about the joint assembly axis 88. Said joint assembly 86 includes a joint member 90 and third means 92 for supporting the second gear 28 relative to said joint member 90. The second gear 28 is positioned about said joint member 90.

The joint member 90 has a generally spherical configuration and is connected to a shaft member 94 of the frame 14. Said shaft member 94 is fixed relative to the frame 14. In the embodiment of FIG. 3, the joint member 90 is also fixed relative to the frame 14 through a fixed connection with said shaft member 94. The third means 92 includes a bearing 96 positioned between said joint member 90 and the second gear 28 to form a ball and socket type assembly having stops 97 to prevent overtravel of the second gear 28. In the embodiment of FIG. 4, the joint member 90 has splines 98 generally positioned along the axis 88 of the joint assembly 86 and is rotatably connected to the shaft member 94 which is splinably connected to the frame 14. Therefore, the joint member 90 rotates relative to the frame 14 about said axis 88 of the joint assembly 86. The third means 92 includes a plurality of balls 100 each connected to the second gear 28 and positioned in a respective groove 102 defined by said splines 98 of the joint member 90. Thrust members 103 are provided to position the third gear 38 relative to the first gear 24.

The first means 31 includes a plurality of pistons 106 each positioned in a respective cylinder 108. The orientation of the pistons 106 along the axis 20 of the frame 14 determines that the drive 13 is of the orbiting axial drive type. Said pistons 106 are hydraulically actuated to act directly on the second gear 28. Said pistons 106 move said second gear 28 along the axis 88 of the joint assembly 86 into engagement with the first and third gears 24,38. The second gear 28 has a central point 104. Points on the inner and outer surfaces 58,29 of said gear 28 pivotally move generally about said central point 104 into contact with the third and first gears 24,38, respectively, in response to said second gear 28 moving generally along the axis 88 of the joint assembly 86. Contact of the inner surface 58 or teeth 60 with the third gear 38 is about 180° from contact with the outer surface 29 or teeth 30 with the first gear 24. The second gear 28 thus moves back and forth between the first and third gears 24,38, in response to actuation of the pistons 106.

It should be understood that the drive mechanism 10, and associated elements such as the first, second and third members 16,18,36 can be of other configurations as is known in the art without departing from the invention.

INDUSTRIAL APPLICABILITY

In the use of the drive mechanism 10, the first gear 24 is rotated by a driving member such as the second gear 28 in order to rotate the sprocket 22. Engagement of the first gear 24 by the second gear 28 creates reaction torquing forces on said gear 28. A single element 34, such as the third gear 38, receives said forces through engagement with said second gear 28 and transmits said forces to the frame 14. The third gear 38 also determines the drive ratio of the drive mechanism 10 owing to the relative tooth engagement of the first, second and third gears 24,28,38. Individual embodiments are hereafter more fully explained.

In referring to the embodiments of FIGS. 1 and 2, reference will be made only to the second and third gears 28,38. The fourth and fifth gears 50,52 of FIG. 1 and the sixth gear 74 of FIG. 2 operate similar to the corresponding members in the drive mechanism 10. In said embodiments, fluid is passed through the valve plate 78 to the pistons 84 in order to rotate the second gear 28. The second gear 28 tends to rotate and nutate relative to the frame 14 and engages and rotates the first gear 24 for driving the sprocket 22. The second gear 28 also engages the third gear 38. Said third gear 38 receives the reaction torquing force on said second gear 28 owing to engagement of said gear 28 with the first gear 24. The force is transmitted through third gear 38 to the frame 14. Engagement of the second gear 28 with both the first and third gears 24,38 also determines the drive ratio of the drive mechanism 10. For gear reduction in the drive mechanism 10, for example, the third gear 38 has at least one tooth less than said first gear 24. In the preferred embodiment of FIG. 1, gear reduction is more flexible owing to the relative orientation of the gears permitting a lesser difference in teeth between the first and third gears 24,38 without special relative tooth configurations.

Referring to the embodiments of FIGS. 3 and 4, the pistons 106 are hydraulically actuated to move the second gear 28 between and into contact with the first and third gears 24,38. As the teeth 60 on the inner surface 58 of the second gear 38 move from engagement with the teeth 64 of the third gear 38, the teeth 64 of the outer surface 62 move into engagement with the teeth 30 of the first gear 24. This resultant meshing of the teeth 64,30 tends to rotate the first gear 28 to drive the sprocket 22. The third gear 38 receives the reaction torquing force on the second gear owing to the corresponding engagement of the third gear 38 with the first gear 24 at a point opposite the engagement of said third gear 38 with the second gear 28. The drive ratio of the drive mechanism 10 is also determined by the difference in teeth between the first and third gears 24,38. Where the number of teeth 25 on the first gear 24 is different than the number of teeth 64 on the third gear 38, said second gear 28 rotates and nutates or "wobbles" about the frame 14 to engage and rotate the first gear 24. Where the number of teeth 25,64 are the same, said second gear 28 only nutates to engage and rotate said first gear 24.

In the above mentioned manner, reaction loads on the second gear 28 from engagement with the first gear 24 are substantially removed from the second means 32 supporting said second gear 28 in rotation about the frame 14. Thus, for example, the third and fourth bearing elements 68,70 in FIGS. 1 and 2 experience substantially reduced loading. The loading is substantially carried by frame 14. The relationship of the gears also permit flexibility in determining the drive or gear reduction ratio for a specific application of the drive mechanism 10.

It should be noted that providing input of the drive mechanism 10 to the second member 18 provides operation of said drive mechanism 10 as a pump, instead of a motor.

Other aspects, objects and advantages will become apparent from a study of the specification, drawings and appended claims.

I claim:

1. In a drive mechanism (10) having a frame (14) having an axis (20), a first member (16) positioned about said frame (14), a first bearing element (26) positioned between said frame (14) and first member (16) and supporting said first member (16) in rotatable relationship relative to said frame (14), a second member (18) positioned generally between said frame (14) and said first member (16) and being movable in an orbital pathway relative to said frame axis (20) and of a construction sufficient for engaging and rotating said first member (16) in response to said second member (18) moving in said orbital pathway, and first means (31) for rotating said second member (18), the improvement comprising:
   second means (32) for supporting said second member (18) in said orbital pathway;
   another member (72) positioned generally between the frame (14) and the first member (16) and being movable in an orbital pathway relative to said frame axis (20) and of a construction sufficient for engaging and rotating said first member (16) in response to said another member (72) moving in said orbital pathway; and
   only a single element (34) of a construction sufficient for establishing the drive ratio of the first member (16) relative to the second member (18) and to said another member (72) and receiving and transmitting reaction torquing force on said second member (18) in response to said second member (18) engaging said first member (16) and on said another member (72) in response to said another member (72) engaging said first member (16).

2. The drive mechanism (10), as set forth in claim 1, wherein said single element (34) is a third member (36) connected to the frame (14) and positioned in contactable relationship with the second member (18).

3. The drive mechanism (10), as set forth in claim 2, wherein the second member (18) has an outer surface (29) of a construction sufficient for engaging said first member (16) and said third member (36) contacts said second member (18) about said outer surface (29) of the second member (18).

4. The drive mechanism (10), as set forth in claim 1, wherein said second means (32) includes
   an eccentric member (66) positioned between the frame (14) and the second member (18),
   a third bearing element (68) positioned between the frame (14) and the eccentric member (66) and supporting said eccentric member (66) in rotation relative to said frame (14), and
   a fourth bearing element (70) positioned between the eccentric member (66) and the second member (18) and supporting said second member (18) in rotation relative to the eccentric member (66) and the frame (14).

5. The drive mechanism (10), as set forth in claim 4, wherein the first means (31) includes a valve plate (78) connected to said eccentric member (66) and rotatable relative to the second member (18) in response to movement of said second member (18) in said orbital pathway.

6. A drive mechanism, comprising:
   a frame (14) having an axis (20);
   a first member (16) positioned about said frame (14);
   a first bearing element (26) positioned between said frame (14) and said first member (16) and supporting said first member (16) in rotatable relationship relative to said frame (14);
   a second member (28) having inner (58) and outer (29) surfaces and being positioned generally between the frame (14) and the first member (16), movable in an orbital pathway relative to said frame axis (20) and of a construction sufficient for rotating said first member (16) in response to said second member (18) moving in said orbital pathway, said outer surface (29) being of a construction sufficient for engaging the first member (16);
   first means (31) for rotating said second member (18);
   second means (32) for supporting said second member (18) in said orbital pathway relative to the frame (14); and
   a third member (36) connected to the frame (14), positioned in contactable relationship with the second member (18) about said inner surface of said second member (18) and of a construction sufficient for establishing the drive ratio of the first member (16) relative to the second member (18) and receiving and transmitting reaction torquing force on said first member (16) in response to said second member (18) engaging said first member (16).

7. The drive mechanism (10), as set forth in claim 6, wherein said first member (16) includes a first gear (24) having an inner surface (23), said inner surface (23) being defined by teeth (25) arcuately spaced one from the other, said second member (18) is a second gear (28), said inner and outer surfaces (58,29) of said second member (18) are defined by teeth (60,30) arcuately spaced one from the other, said teeth (30) of said outer surface (29) being positionable in engagement with the teeth (25) of the first gear (24), and said third member (36) is a third gear (38) having an outer surface (62), said outer surface (62) being defined by teeth (64) arcuately spaced one from the other and positioned in engaging relationship with the teeth (60) of the inner surface (58) of the second gear (28) in response to said second gear (28) engaging and rotating the first gear (24).

8. The drive mechanism (10), as set forth in claim 1, wherein said first member (16) includes a first gear (24) and said third member (36) is a third gear (38) positioned adjacent the first member (16) and concentric with said first gear (24) and including a second bearing element (44) positioned between said third gear (38) and the first member (16) and supporting said third gear (38) in rotation relative to said first member (16).

9. The drive mechanism (10), as set forth in claim 8, wherein the third gear (38) has at least one tooth less than said first gear (24).

10. The drive mechanism (10), as set forth in claim 8, including a connecting member (46) having teeth (48) positioned in engagement with said third gear (38) and being connected to the frame (14).

11. The drive mechanism (10), as set forth in claim 6, wherein the first member (16) includes a first gear (24) having an inner surface (23), said inner surface (23) being defined by teeth (25) arcuately spaced one from the other, said second member (18) is a second gear (28) having inner and outer surfaces (58,29), said outer surface (29) being defined by teeth (30) arcuately spaced one from the other and positionable in engagement with the teeth (25) of the first gear (24), said inner surface (58) being defined by teeth (60) arcuately positioned one from the other and said third member (36) is a third gear (38) having an outer surface (62), said outer surface (62) being defined by teeth (64) arcuately spaced one from the other and positioned in engaging relationship with the teeth (60) of the inner surface (58) of said second gear (24) in response to said second member (18) engaging and rotating the first member (16).

12. The drive mechanism (10), as set forth in claim 11, wherein the third gear (38) has at least one tooth less than said first gear (24).

13. The drive mechanism (10), as set forth in claim 6, wherein said second means (32) includes a joint assembly (86) having an axis (88) and being connected to the frame (14) and the second member (18) and being of a configuration sufficient for freeing said second member (18) for movement relative to said frame (14) generally along and about said axis (88), said axis (88) being substantially parallel to the axis (20) of the frame (14).

14. The drive mechanism (10), as set forth in claim 13, wherein said second member (18) has a central point (104) and respective points on the inner and outer surfaces (58,29) of said second member (18) pivotally move generally about said central point (104) into contact with the third and first members (36,16), respectively, in response to said second member (18) moving generally along the axis (88) of the joint assembly (86), said contact of the inner surface (58) with the third member (36) being about 180° from said contact of the outer surface (29) with the first member (16).

15. The drive mechanism (10), as set forth in claim 13, wherein said joint assembly (88) includes
a joint member (90), and
third means (92) for supporting said second member (18) relative to said joint member (90) and said second member (18) is positioned about said joint member (90).

16. The drive mechanism (10), as set forth in claim 15, wherein said joint member (90) has a generally spherical configuration and is fixed relative to the frame (14) and said third means (86) includes a bearing (96) positioned between said joint member (90) and second member (28).

17. The drive mechanism (10), as set forth in claim 15, wherein said joint member (90) has a generally spherical configuration and splines (98) and is positioned generally along the axis (88) of the first assembly (86) and rotatable relative to the frame (14) about the axis (88) of the joint assembly (86), and the third means (92) includes a plurality of balls (100) each connected to the second member (18) and positioned in a respective groove (102) defined by the splines (98) of said joint member (90).

18. A drive mechanism (10), comprising:
a frame (14) having an axis (20);
a first gear (24) having an inner surface (23) and being positioned about the frame (14), said inner surface (23) being defined by teeth (25) arcuately spaced one from the other;
a first bearing element (26) positioned between said frame (14) and first gear (24) and supporting said first gear (24) in rotatable relationship relative to said frame (14);
a second gear (28) having inner and outer surfaces (58,29) and being positioned generally between said frame (14) and said first gear (24) and movable in an orbital pathway relative to said frame axis (20), said inner and outer surfaces (58,29) being defined by teeth (60,30) arcuately spaced one from the other, said teeth (30) of said inner surface (58) being of a construction sufficient for engaging and rotating said first gear (24) in response to said second gear (28) moving relative to the frame (14);
first means (31) for rotating said second gear (28);
second means (32) for supporting said second gear (28) in said orbital pathway relative to the frame (14);
another gear (74) having inner (76) and outer (77) teeth and being positioned generally between said frame (14) and said first gear (24) and movable in an orbital pathway relative to said frame axis (20), said outer teeth (77) being of a construction sufficient for engaging and rotating said first gear (24) in response to said another gear (74) moving relative to the frame (14); and
a third gear (38) having an outer surface (62) and being fixed to the frame (14) and of a construction sufficient for establishing the drive ratio of the first gear (24) relative to the second gear (28) and to said another gear (74) and receiving and transmitting reaction torquing force on said second gear (28) in response to said second gear (28) engaging said first gear (24) and on said another gear (74) in response to said another gear (74) engaging said first gear (24), said outer surface (62) being defined by teeth (64) positionable in engaging relationship with the teeth (60) of the inner surface (58) of said second gear (28) and the inner teeth (76) of said another gear (74).

19. A drive mechanism (10), comprising:

a frame (14) having an axis (20);

a first member (16) positioned about said frame (14);

a first bearing element (26) positioned between said frame (14) and first member (16) and supporting said first member (16) in rotatable relationship relative to said frame (14);

a second member positioned generally between the frame (14) and the first member (16) and being movable in an orbital pathway relative to said frame axis (20) and of a construction sufficient for engaging and rotating said first member (16) in response to said second member (18) moving in said orbital pathway;

first means (31) for rotating said second member (18);

second means (32) for supporting said second member (18) in said orbital pathway relative to the frame (14);

a third member (36) connected to the frame (14), positioned in contactable relationship with the second member (18) and being of a construction sufficient for establishing the drive ratio of the first member (16) relative to the second member (18) and receiving and transmitting reaction torquing force on said first member (16) in response to said second member (18) engaging said first member (16);

a fourth member (49) positioned generally between the frame (14) and the first member (16) and being movable in an orbital pathway relative to said frame axis (20) and of a construction sufficient for engaging and rotating said first member (16) in response to said fourth member (49) moving in said orbital pathway; and a fifth member (51) of a construction sufficient for establishing the drive ratio of the first member (16) relative to said fourth member (49) and receiving and transmitting the reaction torquing force on said fourth member (49) in response to said fourth member (48) engaging said first member (16).

* * * * *